J. ZAPF.
PLATFORM SPRING ATTACHMENT FOR MOTOR VEHICLES.
APPLICATION FILED AUG. 28, 1919.
1,380,511. Patented June 7, 1921.
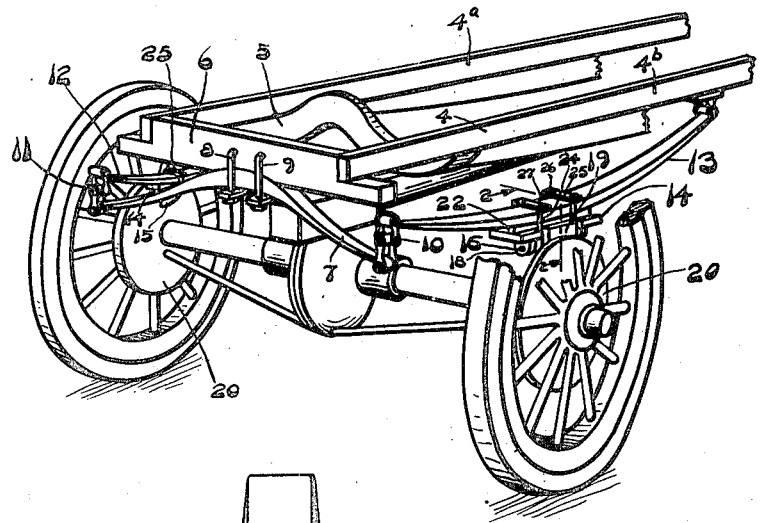
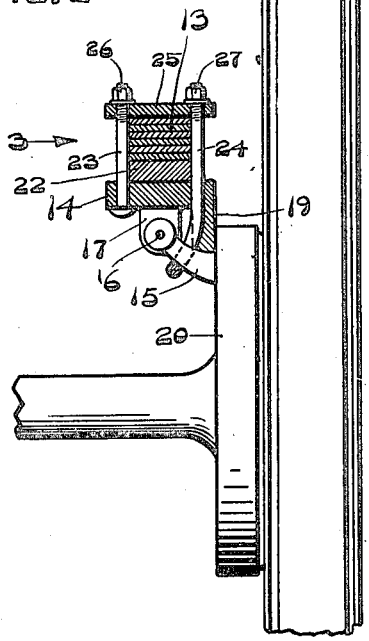
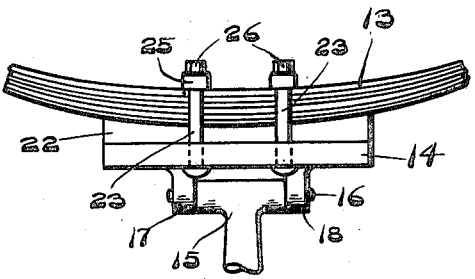

UNITED STATES PATENT OFFICE.

JOHN ZAPF, OF NORTH BEND, OHIO.

PLATFORM-SPRING ATTACHMENT FOR MOTOR-VEHICLES.

1,380,511.  Specification of Letters Patent.  Patented June 7, 1921.

Application filed August 28, 1919. Serial No. 320,379.

*To all whom it may concern:*

Be it known that I, JOHN ZAPF, a citizen of the United States, and a resident of North Bend, in the county of Hamilton and State of Ohio, have invented certain new and useful Improvements in Platform-Spring Attachments for Motor-Vehicles, of which the following is a specification.

In a certain make of motor vehicle now on the market, the rear of the body is mounted at the rear of the chassis frame upon a cross spring which is particularly inefficient when the vehicle passes over rough road surfaces or when it is carrying heavy loads. Owing to the prevailing tendency to convert this type of vehicle into trucks for commercial purposes, the loads to which they are subjected render it highly desirable to provide a different spring suspension which will operate to better advantage than that furnished in the stock equipment of the vehicle.

An object of my invention is to produce a spring attachment which will replace the usual stock spring of the vehicle without material alteration to the body construction. A further object is to provide a spring attachment of the well known platform type for vehicles of the above described construction.

These and other objects are attained in the attachment described in the following specification and illustrated in the accompanying drawing in which:

Figure 1 is a fragmental perspective view of a vehicle equipped with the attachment embodying my invention;

Fig. 2 is a fragmental sectional view taken on the line 2—2 of Fig. 1, showing certain details of my invention; and Fig. 3 is a fragmental view looking in the direction of arrow 3 in Fig. 2.

In adapting my attachment to the type of vehicle above pointed out, I mount an auxiliary frame 4 upon the regular stock frame 5 of the vehicle to be converted, securing it in any suitable manner thereto. To the rear spacer 6 of the auxiliary frame I secure a cross spring 7 by the usual means such as bolts 8 and 9, the ends of the cross spring being connected by shackles 10 and 11 with the rear ends of side springs 12 and 13, the forward ends of the side springs being connected with the side members 4ª and 4ᵇ of the auxiliary frame.

The means for securing the side springs to the rear axle embodies one of the novel features of my invention and in fact renders practical the application and use of a platform spring on a vehicle of the class referred to. This means consists of a bearing plate 14 which is attached to each of the existing perches 15 of the stock vehicle by means of bolts or pins 16 passed through the perches and lugs 17 and 18 formed on the under side of plates 14. A bearing 19 which is cast upon the under side of each plate rests upon perch 15. This construction steadies the *tout ensemble* and renders it more capable of being benefited by the action and reaction of the springs.

Between each side spring and plate 14 a bolster 22 of wood or other similar yielding material is located, bolts 23 being located on one side of the spring and mounted in plate 14, with a U-bolt 24 on the opposite side passing beneath and engaging the perch. Bars 25 connecting the upper ends of the bolts are provided to hold the spring in position, nuts 26 and 27 being provided to clamp spring, bolster and plate together.

In operation any load to which the vehicle is subjected will be taken up by the base of the perch because of the location of bearing 19 thereon, thus rendering this part of the vehicle construction capable of standing much more of a load than that for which it was originally designed. In addition to this, the coöperation of the side springs with the cross spring permit of increased flexibility and consequent increase of smoothness of riding of the vehicle over rough road surfaces. Such a construction is particularly advantageous in saving the frame and body from being twisted and jarred as would occur in constructions using the usual single stock cross spring. An additional advantage is afforded by clamping the springs rigidly to the base of perch 15, thereby making the vehicle body and running gear movement depend entirely on spring action with no side sway of the frame and body with the running gear.

Having thus described my invention what I claim is:

1. In a vehicle having a frame, a cross-spring attached to said frame, side springs attached at their ends to said frame and to the ends of the cross-spring, respectively, a plate secured to and adapted to support each side spring, a perch for each side spring, a pivotal connection between the plates and perches, respectively, and each plate having a bearing adapted to rest upon the adjacent perch.

2. A platform spring attachment for motor vehicles comprising an auxiliary frame adapted to be attached to the frame of the vehicle, a cross spring attached to the auxiliary frame, side springs attached at their ends to the auxiliary frame and to the ends of the cross spring, respectively, means to support said perch, a plate for each side spring, lugs upon each plate, a perch to support each plate, a bolt connecting said lugs and its perch, a bearing on said plate adapted to engage its perch between its ends and adapted to bear a portion of the load on the springs.

3. A platform spring attachment for motor vehicles comprising an auxiliary frame adapted to be attached to the frame of the vehicle, a cross spring attached to the auxiliary frame, side springs attached at their ends to the auxiliary frame and to the ends of the cross spring, respectively, a plate adapted to support each side spring, a perch to support each plate, means to attach each plate to the end of its perch, a bearing on each plate adapted to rest upon its perch between the ends of said perch and support a part of the load upon the springs, and means for clamping each plate to its perch between its ends.

4. A platform spring attachment for motor vehicles comprising an auxiliary frame adapted to be attached to the frame of the vehicle, a cross spring attached to the auxiliary frame, side springs attached at their ends to the auxiliary frame and to the ends of the cross spring, respectively, a plate for each side spring, a perch to support each plate, means for supporting each perch, means for attaching each plate to its perch at the end of said perch, a bearing on each plate adapted to engage its perch between the ends of said perch and support a part of the load, bars extending across said side springs, bolts attached to one end of said bars and to said plate and a U-bolt attached to the other end of said bars and taking over each perch, whereby said perch, plate and springs are firmly secured together.

5. In a vehicle having a frame, a cross-spring attached to said frame, side-springs attached to said frame and to the ends of the cross-springs, respectively, a perch for each side spring, a plate interposed between each spring and its perch, and having a downwardly extending integrally formed bearing resting upon said perch, means for pivotally attaching said plate to the end of its perch, bars resting upon said spring, bolts taking through said plate and one end of said bars, respectively, and a U-bolt embracing said perch and bearing and taking through the other end of said bars, respectively, whereby said members are clamped together.

6. A platform spring attachment for motor vehicles comprising an auxiliary frame adapted to be attached to the main frame of the vehicle, a cross spring attached to the auxiliary frame, side springs attached to the auxiliary frame and cross spring, respectively, a perch for each side spring, a plate interposed between and attached to each side spring and perch, respectively, and having a bearing adapted to rest upon the base of said perch whereby the load is largely supported by said base and the vehicle is relieved of any sudden jarring motion by reason of the combined motion of the cross and side springs, respectively.

JOHN ZAPF.

Witnesses:
JAMES N. RAMSEY,
MARY E. MCCONNELL.